US012749347B2

(12) United States Patent
Zaghetto et al.

(10) Patent No.: US 12,749,347 B2
(45) Date of Patent: Sep. 29, 2026

(54) METHOD AND SYSTEM FOR IDENTIFYING A USER AND NON-TRANSITORY COMPUTER READABLE STORAGE MEDIUM

(71) Applicant: SAMSUNG ELETRÔNICA DA AMAZÔNIA LTDA., Campinas (BR)

(72) Inventors: Cauê Zaghetto, Campinas (BR); José Roberto Ribeiro Junior, Campinas (BR); Pedro Diamel Marrero Fernandez, Recife (BR); Caio Fernando Peres, Campinas (BR)

(73) Assignee: SAMSUNG ELETRONICA DA AMAZONIA LTDA., Campinas (BR)

( * ) Notice: Subject to any disclaimer, the term of this patent is extended or adjusted under 35 U.S.C. 154(b) by 179 days.

(21) Appl. No.: 18/412,853

(22) Filed: Jan. 15, 2024

(65) Prior Publication Data

US 2025/0182529 A1 Jun. 5, 2025

(30) Foreign Application Priority Data

Dec. 5, 2023 (BR) ...................... 10 2023 025545 0

(51) Int. Cl.
*G06K 9/00* (2022.01)
*G06F 3/04883* (2022.01)
(Continued)

(52) U.S. Cl.
CPC .......... *G06V 40/30* (2022.01); *G06F 3/04883* (2013.01); *G06T 11/23* (2026.01); *G06V 40/20* (2022.01)

(58) Field of Classification Search
None
See application file for complete search history.

(56) References Cited

U.S. PATENT DOCUMENTS 6,249,606 B1 6/2001 Kiraly et al.
7,263,211 B2 8/2007 Yoshii et al.
(Continued)

FOREIGN PATENT DOCUMENTS

EP 4379521 A1 * 6/2024 ........... G06F 40/171
WO WO 2015/162607 A1 10/2015

OTHER PUBLICATIONS

Nan Zhen et al., "An Efficient User Verification System Using Angle-based Mouse Movement Biometrics" AMC Transaction on Information and System Security, vol. V, No. N, Article 1234, Oct. 2015; 29 pages.

(Continued)

*Primary Examiner* — Wei Wen Yang

(57) ABSTRACT

A method of identifying a user comprising: acquiring a signal representing an identification drawing input generated by an unconstrained movement of the user on an interactive surface; generating an image that corresponds to the signal; processing the signal to generate a user behavior vector; and identifying the user by comparing the image with an identification image representing an identification drawing previously stored in association with the user; and comparing the user behavior vector with a previously user behavior vector associated with the identification drawing. Moreover, the present invention also refers to an analogous system and non-transitory computer readable medium for performing the proposed identifying method of the user by an unconstrained free draw on an interactive surface.

19 Claims, 9 Drawing Sheets

(51) Int. Cl.
*G06T 11/23* (2026.01)
*G06V 40/20* (2022.01)
*G06V 40/30* (2022.01)

(56) References Cited

U.S. PATENT DOCUMENTS

| | | | | |
|---|---|---|---|---|
| 7,593,000 | B1 | 9/2009 | Chin | |
| 9,589,120 | B2 | 3/2017 | Samuel | |
| 9,747,491 | B2 | 8/2017 | Mettyear et al. | |
| 2003/0233557 | A1 | 12/2003 | Zimmerman | |
| 2010/0225443 | A1 | 9/2010 | Bayram et al. | |
| 2015/0248567 | A1 | 9/2015 | Avni et al. | |
| 2017/0140138 | A1* | 5/2017 | Samuel | G06F 21/84 |
| 2018/0300542 | A1* | 10/2018 | Waddell | G06V 30/387 |
| 2019/0272090 | A1* | 9/2019 | Lee | G06F 3/04883 |
| 2024/0419382 | A1* | 12/2024 | Dekel | G06V 20/70 |

OTHER PUBLICATIONS

Peng Xu et al., "Deep Learning for Free-Hand Sketch; A Survey" arXiv:2001.02600v3 [cs.CV]; Feb. 1, 2022; 27 pages.

Gao Huang et al., "Densely Connected Convolutional Networks" arXiv: 1608.06993v5 [cs.CV]; Jan. 28, 2028; 9 pages.

Peng Xu et al., "On Learning Semantic Representations for Large-Scale Abstract Sketches" IEEE Transactions on Circuits And Systems for Video Technology, vol. 31. No. 9, Sep. 2021; pp. 3366-3379.

Ting Yu "On Mouse Dynamics as a Behavioral Biometric for Authentication" ResearchGate; https://www.researchgate.net/publication/221609165; Mar. 2011; 8 pages.

Amr Hefny "Online Signature Verification Using Deep Learning and Feature Representation Using Legendre Polynomial Coefficients" ResearchGate; https://www.researchgate.net/publication/331824260; Jan. 2020; 14 pages.

Christopher Varenhorst "Passdoodles; a Lightweight Authentication Method" Research Science Institute; Jul. 27, 2004; 13 pages.

Hangyu Lin et al., "Sketch-BERT: Learning Sketch Bidirectional Encoder Representation from Transformers by Self-supervised Learning of Sketch Gestalt" arXiv:2005.09159v1 [cs.CV]; May 19, 2020; 10 pages.

Hangyu Lin "TC-Net for iSBIR: Triplet Classification Network for Instance-level Sketch Based Image Retrieval" 9 pages.

Alexander Chan et al., "Touchpad Input for Continous Biometric Authentication" IFIP International Federation for Information Processing 2014; pp. 86-91.

* cited by examiner

METHOD AND SYSTEM FOR IDENTIFYING A USER AND NON-TRANSITORY COMPUTER READABLE STORAGE MEDIUM

CROSS-REFERENCE TO RELATED APPLICATION(S)

This application is based on and claims priority under 35 U.S.C. § 119 to Brazilian Patent Application No. BR 102023025545-0, filed on Dec. 5, 2023, in the Brazilian Intellectual Property Office, the disclosure of which is incorporated by reference herein in its entirety.

FIELD OF THE DISCLOSURE

The present invention is related to automatic individual authentication and identification. The verification process is a one-versus-one procedure to attest a claimed identity and the identification is a one-versus-many procedure to determinate the identity of a given person from a database of persons known to the system.

DESCRIPTION OF RELATED ART

Traditional methods of authentication usually rely on passwords in order to assert the authenticity of the user. With technological advancements, more convenient methods of authentication and recognition have been employed using users' biometrics, such as fingerprint and face recognition.

Biometric authentication, or simply biometrics, may be defined as the automatic verification or identity recognition of an individual based on physiological and behavioral characteristics. Fingerprint, hand geometry, voice, iris, face, hand-write, and keystroke are examples of such characteristics. Different biometric systems require specific technologies, depending on the physiological/behavioral characteristic which is being used.

The search for biometric systems that are increasingly secure, efficient, and convenient is what moves researchers in the field of Biometrics. Although there are traditional biometric systems with high performance (e.g., fingerprints), these systems are not perfect and open up space for new ones to emerge. However, it should be noted that a high matching rate is not sufficient for a biometric system to be considered and adopted. In fact, factors such as universality, permanence, acceptability, and others also need to be taken into account.

This invention has two sets of related works: a) symbol classification using visual feature learning (off-line static approach); and b) behavioral biometrics based on the way in which an individual manipulates interactive surfaces (online dynamic approach).

The static approach employs an analysis of the visual features present in images formed by projecting freely drawn symbols onto the image plane. To conduct this analysis, Convolutional Neural Networks (ConvNets) are utilized, which are considered cutting-edge in image representation. Although this area is in constant evolution, at this moment, the sophisticated variations of ConvNets based on ResNet models and that include some components design of the hierarchical vision Transformer (Swin), how ConvNeXt and InceptionNeXt, have reported the best result in the ImageNet-1K and ImageNet-22K datasets.

Several works have been publicized in the Free-Hand Sketch area. Peng Xu et al. (P. Xu, Y. Huang, T. Yuan, T. Xiang, T. M. Hospedales, Y.-Z. Song, and L. Wang, "On learning semantic representations for large-scale abstract sketches," IEEE Transactions on Circuits and Systems for Video Technology, vol. 31, no. 9, pp. 3366-3379, 2020) proposed a static and dynamic analysis using a dual-branch CNN-RNN neural network. The architecture includes a deep hashing model for sketch retrieval and a deep embedding model for Sketch zero-shot recognition. Another recent method Sketch Bidirectional Encoder Representation from Transformer (Sketch-BERT) (H. Lin, Y. Fu, X. Xue, and Y.-G. Jiang, "Sketch-bert: Learning sketch bidirectional encoder representation from transformers by self-supervised learning of sketch gestalt," in Proceedings of the IEEE/CVF Conference on Computer Vision and Pattern Recognition, pp. 6758-6767, 2020), employed an architecture based on Bidirectional Encoder Representations (BERT) for the dynamic characterization of the Sketch. Hangyu Lin et al. (H. Lin, Y. Fu, P. Lu, S. Gong, X. Xue, and Y.-G. Jiang, "Tc-net for isbir: Triplet classification network for instance-level sketch based image retrieval," in Proceedings of the 27th ACM international conference on multimedia, pp. 1676-1684, 2019) proposed a Triplet Classification Network for sketch retrieval using convolution neural networks (DenseNet-169 (G. Huang, Z. Liu, L. Van Der Maaten, and K. Q. Weinberger, "Densely \ connected convolutional networks," in Proceedings of the IEEE conference on computer vision and pattern recognition, pp. 4700-4708, 2017)) as a feature extraction component.

Peng Xu et al. (P. Xu, T. M. Hospedales, Q. Yin, Y.-Z. Song, T. Xiang, and L. Wang, "Deep learning for free-hand sketch: A survey," IEEE transactions on pattern analysis and machine intelligence, vol. 45, no. 1, pp. 285-312, 2022) presented a comprehensive survey of the deep learning techniques oriented at free-hand sketch data. They analyzed the differences between sketch data and other data modalities, e.g., natural photos. Same way, Sketch does not necessarily represent biometric data. The works in the Sketch recognition problem are centered on recognizing the form of the Sketch, and they are not interested in identifying the creator of the drawing.

The reliance solely on visual inspection of two sketches is inadequate for establishing the provenance of drawings as being from the same author. As such, there exists a necessity for the inclusion of features that enable the examination of temporal dynamics of the strokes. To this end, the subsequent section outlines a dynamic element, which is intended to be merged with the static analysis.

The study of the applicability of touchscreen input as a behavioral biometric for continuous authentication and the study of user interaction with touchscreens based on swipe gestures for personal authentication have already being addressed. Especially with regard to swipe gestures for user authentication in smartphones, some promising work have been proposed.

Graphical password-based methods for user authentication have received increased attention in recent years. In particular, Christopher Varenhorst et al. (Varenhorst, C., Kleek, M. V., & Rudolph, L. (2004). Passdoodles: A lightweight authentication method. Research Science Institute, 1-11) have demonstrated the feasibility of authentication using unique sketches or doodles, employing a simple signal description. Marcos Martinez-Diaz et al. have recently enhanced these methods by proposing an authentication approach based on dynamic signature verification. Their method combines Dynamic Time Warping (DTW) with Gaussian Mixture Models (GMMs) for the characterization of doodle signals. Although this method has shown improvements over previous approaches, it still exhibits an equal error rate (EER) ranging from 3% to 8% when faced with random forgeries. Although graphical password-based methods using unique sketches or doodles are somehow related to our proposal, we may highlight as least the following differences: they are not based in ConvNet and triplet loss function to calculate the difference between the sketches, do not combine in cascade a set of classifiers to evaluate dynamic and static patterns of the sketches, do not offer an agnostic method capable of performing user identification, authentication and continuous authentication, do not offer a framework which considers that the static multi-class CNN classifier will first evaluate a static sketch and, afterwards, select a user-specialized dynamic classifier. Another difference that we may highlight is that our method seems to be more accurate than the state of the art.

Another interesting topic related to our proposal are online handwritten signature verification systems. Similarly, to mobile swipe or to our touch-pad free-drawn recognition proposal, online handwritten signature verification processes use people unique dynamic way to write (and also sign theirs names) as a behavioral biometric trait. To perform the classification in order to identify the individual, dynamic features are extracted from handwriting processes performed on touchscreen devices. For example, we may consider classical approaches such as online signature verification based on Dynamics Time Warping (as described in M. Müller, "Dynamic time warping," Information retrieval for music and motion, pp. 69-84, 2007) features extraction and neural network classification (as described in M. M. Fahmy, "Online handwritten signature verification system based on dwt features extraction and neural network classification," Ain Shams Engineering Journal, vol. 1, no. 1, pp. 59-70, 2010) or even online signature verification using deep learning and feature representation using Legendre polynomial coefficients (as described in A. Hefny and M. Moustafa, "Online signature verification using deep learning and feature representation using legendre polynomial coefficients," in The International Conference on Advanced Machine Learning Technologies and Applications (AMLTA2019) 4, pp. 689-697, Springer, 2020). The common idea between these aforementioned works is: explore the way in which an individual manipulates interactive surfaces as a kind of unique behavior that could be used for individuals' identification purpose.

Finally, some work especially applied to users identification based on mouse or touch-pad dynamic manipulation have also been proposed. A user verification system using angle-based mouse movement biometrics was proposed by N. Zheng, A. Paloski, and H. Wang, "An efficient user verification system using angle-based mouse movement biometrics," ACM Transactions on Information and System Security (TISSEC), vol. 18, no. 3, pp. 1-27, 2016, and a work based on mouse dynamics as a behavioral biometric for authentication was proposed by Z. Jorgensen and T. Yu, "On mouse dynamics as a behavioral biometric for authentication," in Proceedings of the 6th ACM symposium on information, computer and communications security, pp. 476-482, 2011. Additionally, a work based on touchpad input for continuous biometric authentication using kernel density estimation and decision tree classification has also been proposed by A. Chan, T. Halevi, and N. Memon, "Touchpad input for continuous biometric authentication," in Communications and Multimedia Security: 15th IFIP TC 6/TC 11 International Conference, CMS 2014, Aveiro, Portugal, Sep. 25-26, 2014. Proceedings 15, pp. 86-91, Springer, 2014. For this work in particular, the authors proved capable of classifying data sets with over 90% accuracy.

Although all aforementioned works have interesting approaches and results, none of them propose a method to recognize free-drawn symbol dynamics on interactive surfaces of computing devices associated with image pattern matching based on convolutional neural networks techniques in order to identify, authenticate, and continuously authenticate users.

While additional sensors would need to be inserted in a given computing device in order to acquire users' biometric traits (e.g., fingerprint sensor), some devices, by construction, already have embedded sensors able to capture signals that could be used as biometric inputs as, for example, devices comprising interactive sensible surfaces. As a concrete example, we may consider a laptop, which has an embedded touchpad, or a tablet, which has an entire screen that is sensible to touch or stylus inputs. Electronic surfaces, such as touch screens, touch pads, and other electronic devices with sensible surfaces could be used to retrieve user's biometrics. Devices that embed these electronic surfaces can also be improved further in the future, such that new electronic input devices may be present and used for capturing user's biometrics. The interaction of the user with these devices also can be in many ways, such as using their finger, stylus (electronic pen), pointer device, or other devices.

Although there are commercially mature solutions for performing user authentication using biometrics, new ways of proposing advances in usability and/or security will continue to emerge.

In this context, patent U.S. Pat. No. 7,263,211B2 proposes an information processing apparatus and method for processing data which is input through a coordinate input device, a computer-readable memory, and a program. The method and apparatus are conceived as a signature verification system based on dynamic features extracted from a time series signal containing the coordinates over time of each point of a written signature. The signal is acquired using a capture-able device: However, U.S. Pat. No. 7,263,211B2 does not use convolutional neural networks (CNN), works for signature but not for complex unconstrained free-draw, does not use machine learning at all in the solution, it does not work for simple finger inputs, does not combine CNN approaches with a set of ML classifiers to have a combined classifier able to the verify visual attributes of the drawn symbol as well as users' dynamic behavior during the unconstrained drawing process. Additionally, scenarios that employ this solution usually uses an additional hardware for the authentication, such as an external input device, as a screen, along with a stylus pen for actual signing, which makes it difficult for embedding in the majority of common mobile devices.

U.S. patent U.S. Pat. No. 9,747,491B2 also propose dynamic handwriting verification and handwriting-based user authentication. Similar to U.S. Pat. No. 7,263,211B2, this patent proposes a method to perform user verification based on dynamic features extracted from signature procedures. Yet, it does not refer to abstract free-draw symbols and this patent is conceived to work only for handwritten signatures. Besides, it uses a different set of dynamic features if compared to our proposal (e.g., hiatus analyses, dynamic time warping distance) and does not use visual features extracted by projecting the signal onto the image plane and for classification purposes using CNN approaches.

In this same context (handwriting signature verification), we may also cite patents (US20100225443, US20150248567, WO2015162607A1, US20030233557), but all of them are applied to signature verification systems, which does not work with free-drawn inputs signals acquired by an interactive surface sensor during the unconstrained movement of the users' fingers, and does not combine complementary static and dynamic approaches.

Related to signature recognition systems, some works have also proposed gesture recognition systems based on interactions with electronic devices. For instance, patent U.S. Pat. No. 6,249,606B1 proposes a gesture recognition method based on mouse pointer motion pattern and patent U.S. Pat. No. 7,593,000B1 has proposed a touch-based authentication method of a mobile device able to recognize a tactile pattern on a touch screen without a visual aid as an unlocking gesture. Finally, in this context, the patent U.S. Pat. No. 9,589,120B2 uses constrained swipes-based interaction with electronic devices to perform the authentication. Nevertheless, none of documents U.S. Pat. No. 6,249,606B1, U.S. Pat. No. 7,593,000B1 and U.S. Pat. No. 7,593,000B2 offer a method for user's recognition and authentication based on unconstrained free-drawn procedures made on interactive surfaces of computing devices which is resistant to simple reproduction attacks which inventively combines two complementary approaches: a) convolutional neural networks approach, which explores the visual features extracted from the projection onto the image plane of the acquired unconstrained free-draw time series signal, which enables a meticulous examination of its visual characteristics; and b) dynamic analysis of users' unique behavior while manipulating the interactive surface in which the free drawing procedure is being made.

The main problem addressed by our invention is related to security and user experience during authentication procedures on computational devices. Authentication methods based on the secrecy of some information, such as passwords and PINs, are considered to be very inconvenient to the users, since they have to memorize different secret information for each one of the different system they use, or, even worse, they tend to repeat the same secret information on different systems or even register and keep these information in non-secure locals (e.g.: drawer, personal notebooks).

Furthermore, authentication systems based only on the secrecy of some information are susceptible to attacks in which a malicious person can get access to these secret information. As an example, we may cite social engineer techniques or shoulder surfing attacks by which the password or PIN of the user are compromised and, afterwards, used by an attacker to get undue access to the system. Another problem related to passwords and PINs is that they can be leaked and therefore compromised.

As an alternative method which capable of solving the aforementioned problem related to password and PIN leakage, multi-factor authentication (MFA) procedures have been proposed. Although MFA procedures tends to minimize problems related to this issue, they certainly worsen the user experience, and, for some users, may even be considered a very inconvenient solution.

In this sense, secure and convenient ways to authenticate users are constantly being proposed and improved. In this context, the state of the art lacks a solution capable of performing users' recognition which is at same time resistant to secret information leakage problem and convenient to the user, maintaining both security and usability intact.

In this work in particular, it is explored the feasibility to use people behavior during unconstrained free-drawings process on interactive surfaces, such as laptop's touch-pads or electronic tablet touchscreens, among others, as a kind of behavioral biometric trait that could be used for user authentication purpose.

SUMMARY OF THE INVENTION

According to an embodiment, the present invention provides a method of identifying a user comprising: acquiring a signal representing an identification drawing input generated by the an unconstrained movement of the user on an interactive surface; generating an image that corresponds to the signal; processing the signal to generate a user behavior vector; and identifying the user by comparing the image with an identification image representing an identification drawing previously stored in association with the user; and comparing the user behavior vector with a previously user behavior vector associated with the identification drawing.

Moreover, according to an embodiment, the present invention provides a system of identifying a user comprising a memory and a processor configured to perform a method of identifying a user based on an unconstrained free draw on an interactive surface.

According to an embodiment, the present invention provides a non-transitory computer-readable storage medium for performing a method of identifying a user based on an unconstrained free draw on an interactive surface.

BRIEF DESCRIPTION OF THE DRAWINGS

The invention is explained in greater detail below and references the drawings and figures attached herewith, when necessary. Attached herewith are the following.

DETAILED DESCRIPTION OF THE INVENTION

Figure 1:
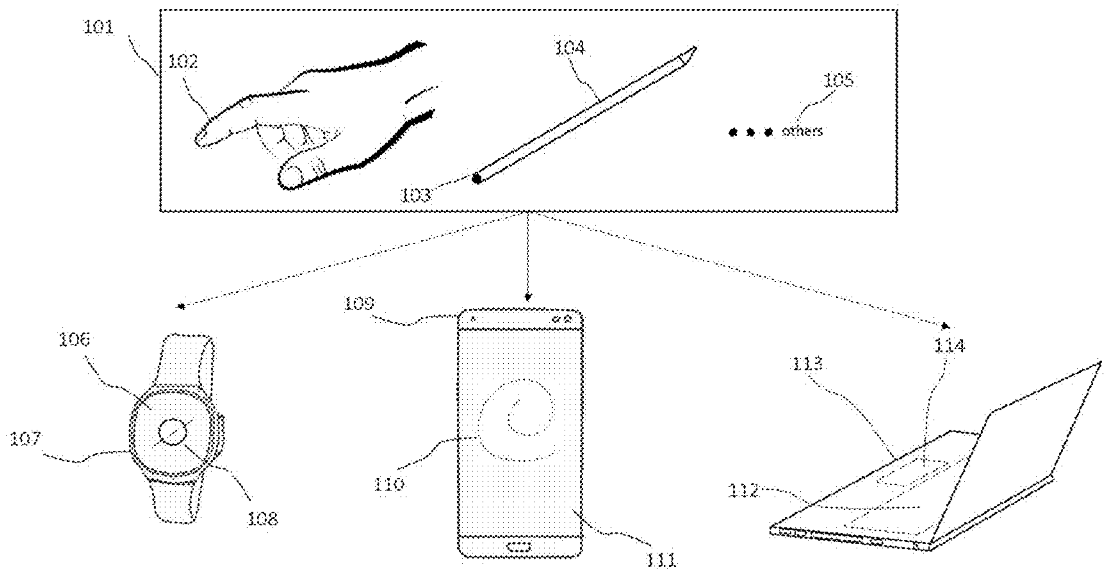
FIG. 1 presents a conceptual illustration of types of inputs and devices according to an embodiment of the present invention.

The proposed invention aims to introduce the idea of combining static image pattern recognition strategies with dynamic drawing behavioral analysis to generate a combined classifier able to distinguish a given input to an electronic surface capturing device as legit (or not) with higher degree of confidence. To illustrate a more practical scenario, we can consider the case in which a touch-pad draw is used as an authentication method to a user to log in to the operating system. In this case, even if some attacker is able to reproduce the draw/symbol itself, this will not be enough for the attacker to gain access to the system, since the on-line analysis of the drawing process will indicate that the drawing dynamics of the attacker differs from that of the legit user.

The proposed invention aims to present a solution that explores the way in which an individual manipulates interactive surfaces as a unique behavior that could be used for individuals identification purpose. In this regard there are still a lot of room for refinements, especially with regard to the scenario in which an unconstrained free drawing procedure performed on an interactive surface sensible to touch (or electronic pen) is being used to authenticate users.

In this sense, we are proposing a method to correctly recognize individuals that uses two complementary approaches:

a) image pattern similarity (hereinafter referred as off-line static approach), based on the matching between a pre-registered draw registered to the system and an actual draw the is being presented; and b) user unconstrained free-draw behavioral trait (hereinafter referred as on-line dynamic approach), based on the dynamic analysis of users' unique behavior while manipulating the interactive surface in which the free drawing process is being made.

Thus, one objective of the present invention is to prove the feasibility to use signals, acquired by the interactive surfaces' sensors, during the unconstrained movement of the users' fingers (or any other proper object such as electronic pens), for identification purposes in real-time.

Another objective of the present invention is to propose a method to identify, authenticate, and continuously authenticate individuals based on the unconstrained free drawing procedure performed on interactive surfaces sensible to touch using a combination of off-line static and on-line dynamic approaches.

Another objective of the present invention is to propose a new method to perform user authentication based on unconstrained free-drawn procedures made on interactive computing devices surfaces which is resistant to simple reproduction attacks.

The present invention refers to a method for identifying a user comprising: acquiring a signal representing an authentication drawing input generated by the unconstrained movement of a user on an interactive surface; generating an image that corresponds to the signal; processing the signal to generate a user behavior vector; and authenticating the user by i) comparing the image with an authentication image representing an authentication drawing previously stored by the user; and ii) comparing the user behavior vector with a previously user behavior vector associated with the authentication drawing.

Generally, the present invention refers to a method to identify individuals based on the unconstrained free-drawing procedure performed on sensible interactive surfaces. In this sense, we are proposing a method to correctly recognize individuals that uses two complementary approaches: a) image pattern similarity (hereinafter referred as off-line static approach), based on the matching between a pre-registered draw registered to the system and an actual draw that is being presented; and b) user unconstrained free-draw behavioral trait (hereinafter referred as on-line dynamic approach), based on the dynamic analysis of users' unique behavior while manipulating the sensible interactive surface in which the free-drawing process is being made.

As shown in FIG. 1, the sensible surfaces may be embedded on and work with a whole set of touch-inputs (101), such as, but not limited to, a human finger (102), an electronic pen (104) with a proper tip (103), or any other proper devices or input types (105). The sensible interactive surfaces may be embedded to most varied devices. As an example, we may consider a typical smartwatch (107), with a sensible interactive area (106), in which a free-draw (108) may be input. It should be remarked that, hereinafter, a free-draw should be understood as a personalized draw, made by a user, using his/her finger or any other input device (e.g., electronic pen), without any constraints (i.e., connecting dots, draw straight lines, and others), on a sensible interactive surface. As another examples, we may consider a smartphone (109) with a touch screen (111) where a free-draw (110) could be input, or also a laptop (113), with sensible touch-pad (114), usually located close to the keyboard (112), in which a free-draw could be input.

Figure 2:
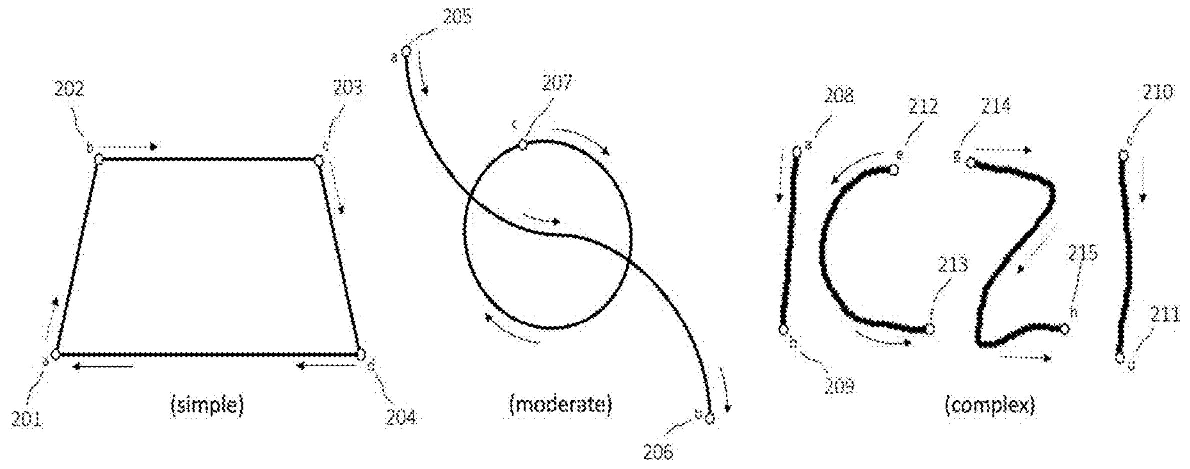
FIG. 2 presents examples of free drawing inputs to the system according to an embodiment of the present invention.

As previously mentioned, the proposed method combines two different complementary approaches to perform the individual identification: image pattern similarity and dynamic analysis of users' unique behavior while manipulating the sensible interactive surface during the free-drawing process. In this sense, the input signals to our method are both the free-draw images itself, as well as the time series representing the coordinates of each activated/sensitized point of the sensible surface in a given time t. In FIG. 2, examples of free-draw inputs are presented. The examples are presented from the left to the right in crescent order of complexity, being the two first ones, named 'simple' and 'moderate', more theoretical well behaved examples, and the third one, named 'complex', a more realistic example. For all the examples of FIG. 2, small letters (e.g., 'a', 'b', 'c', . . . ) are used to represent abstract points used to represent a given sequence of the free-drawing procedure, and arrows used represent the drawing orientation.

On the 'simple' free-draw example, the starting point of the draw in which the individual first touches the sensible surface is the point 'a' (201). After that, the individual draws something similar to a trapezium passing through points 'b' (202), 'c' (203), 'd' (204), and finally ending up at 'a' (201). In short, the individual performs a free-draw in the sequence a→b→c→d→a. Another thing that should be highlighted is that, in this example, the complete drawing process comprises just one symbol, the trapezium itself. In other words, the individual completes all the drawing sequence without removing the finger (or other input source, e.g., electronic pen) from the sensible surface.

On the 'moderate' complexity free-draw example, point 'a' (205) is the starting point of the drawing. After that, the individual draw, from point 'a' (205) to point 'b' (206), following the curve indicated in FIG. 2. Finishing the first symbol, but still as a part of the same free-draw procedure, the individual temporarily removes the finger from the sensible surface and then touches again the sensible surface at point 'c' (207). From this point, the individual performs a circular clockwise motion starting and ending at point 'c'

(207). In short, the entire free-draw procedure comprises two different symbols, drawn in the following sequence: (a→b)+(c→c), in which the + signal indicates that the complete drawing sequence is composed by two different combined symbols.

Finally, for the 'complex' free-draw example, we have a more realistic example in which the drawn lines have considerable imperfections. Note that, for this the entire draw, the individual input as a part of the same free-draw procedure four different symbols, following the sequence: (a→b)+(c→d)+(e→f)+(g→h). In fact, first a line similar to a vertical bar starting as the point 'a' (208) and ending at point 'b' (209) is drawn, second another line starting as the point 'c' (210) and ending at point 'd' (211) is drawn, third a symbol similar to the letter 'C' starting at 'e' (212) and ending at point 'f' (213) is drawn, and finally a symbol similar to the letter 'Z' starting at point 'g' (214) and ending at 'h' (215) is drawn. To illustrate a practical scenario, we may consider the situating where a free-draw procedure is being made in a laptop's touch-pad and, by consequence, a free-draw correspondent signal is being acquired. This acquired signal is composed by horizontal (x) and vertical (y) coordinates of all points of the draw in a given time t.

When the draw procedure is being performed by the user on the sensible interactive surface of a computing device, we may consider that a kind of visual feedback may or may not be given to the user. To exemplify, we may consider a scenario where the user is performing the draw procedure on a laptop's touch-pad and the draw that is being made does not visually appears anywhere. To clarify, in this situation, although the user is performing the draw on the touchpad, no visual feedback is shown on the screen of the laptop. This approach make it difficult for some unauthorized person to see the draw that is being made. In other words, this approach focus to preserve the secrecy of the draw chosen by the user to identify himself to a system.

On the other hand, we may consider that from the user experience point of view, it will be better if the system gives some kind of visual feedback to the user while the draw is being performed on the sensible interactive surface of the computing device. To exemplify, we may consider a scenario where the user is performing the draw procedure on the touchscreen of a mobile phone. In this scenario, as the touchscreen also has the capability to display images, a feedback image that represents in the visual domain the symbol that is being drawn may be given to the user. In other words, the drawn symbol is acquired by the touchscreen and also shown on the touchscreen for the user during the draw procedure.

Still in the context of the visual feedback the user, we may consider that the system may give a feedback image applying a kind of visual effect to the drawn curves and lines made by the user during the free draw procedure. To clarify, besides from showing on the screen the complete draw to the user (and potentially to an attacker), the system may apply a kind of fadeout effect in order to partially show the lines and curves drawn by the user during the draw procedure. This fadeout effect intends to erase parts of the draw input before a time threshold and maintain parts drawn after this threshold. With this king of strategy, we can make it possible to give a visual feedback to users, potentially improving their experience and yet maintaining, in some level, the secrecy of the complete free draw. In other words, an unauthorized observer (i.e., attacker) may see part of the draw, but will never see the complete draw with just one look. Besides from the fadeout effect, we may consider any other of effect, which has the same purpose.

Figure 3:
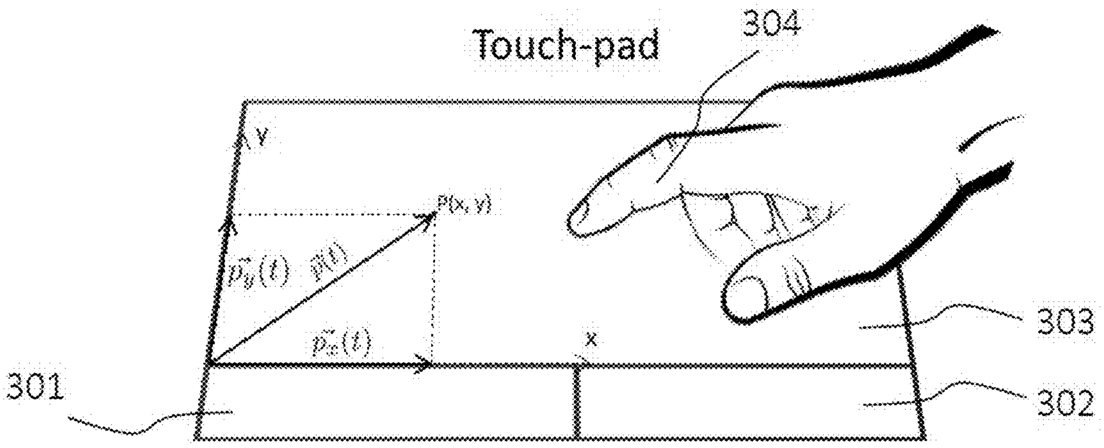
FIG. 3 presents an illustration of the coordinates system used to represent each point of a draw/input according to an embodiment of the present invention.

Conceptually, the position of each acquired point P(x,y) of the draw is expressed as a vector $\vec{p}(t)$ presenting the components $\vec{p}_x(t)$ and $\vec{p}_y(t)$, in axes x, y, respectively, as presented in FIG. 3. In the illustration presented in FIG. 3, one can see a touch-pad typical interactive area (303) being touched by a person's finger (304). For reference only, (301) and (302) represent typical buttons of a touch-pad device.

Figure 4:
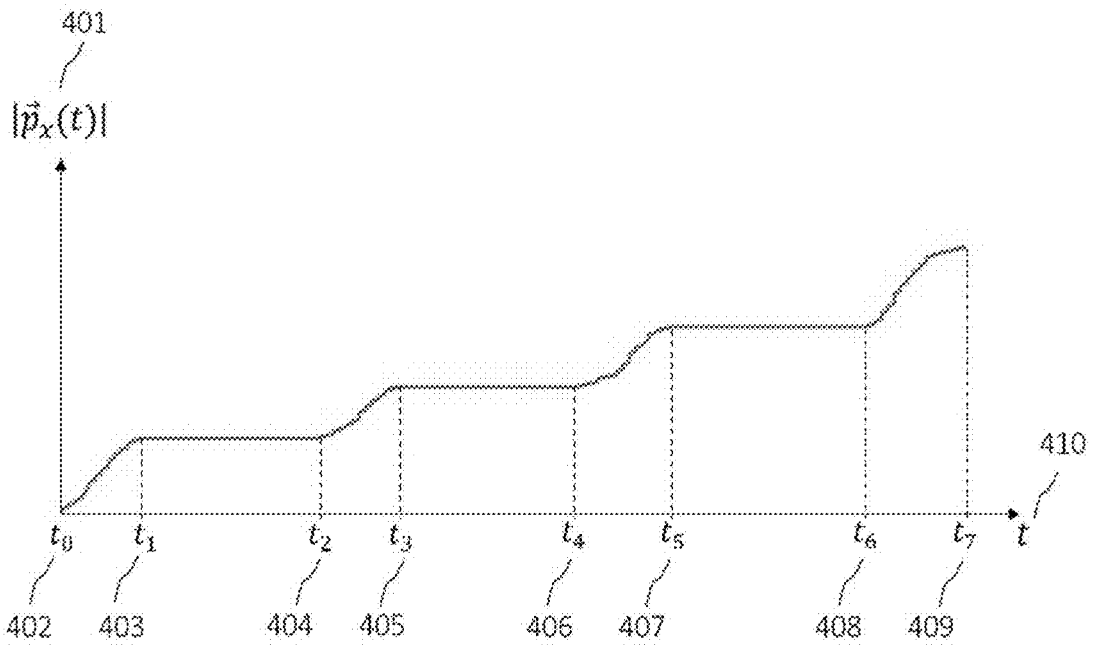
FIG. 4 presents an example of the horizontal component values over time of an acquired drawn-signal according to an embodiment of the present invention.

A typical example of the horizontal component values (401) over time (410) of an acquired drawn-signal is presented in FIG. 4.

This example tends to illustrate a case in which an individual draws four different symbols as part of the same free-drawing procedure. Starting the free-draw procedure at $t_0$ (402), from $t_0$ (402) to $t_1$ (403) one may see that the horizontal coordinates $|\vec{p}_x(t)|$ (401) of points P(x,y) are varying: This indicates that the individual is manipulating the interactive surface during this time interval. From $t_1$ (403) to $t_2$ (404), $|\vec{p}_x(t)|$ does not vary. This may indicate two things: 1) if $t_2-t_1>T$, then the individual has ended the entire free-draw procedure; 2) if $t_2-t_1<=T$, $t_2-t_1$ is just a hiatus between two subsequent symbols of the same free-draw procedure, being T a time interval threshold that may be defined accordingly to some criterion or requirement of the system. For example, T may be half a second, one second, two seconds, or others. Considering this specific example, the four intervals $t_1-t_0$ (403)(402), $t_3-t_2$ (405)(404), $t_5-t_4$ (407)(406), and $t_7-t_6$ (409)(408), contain variations of $|\vec{p}_x(t)|$ values and, therefore, represent moments in which the individual was performing a free-draw procedure on the interactive sensible surface of the computer device. On the other hand, the three intervals $t_2-t_1$, $t_4-t_3$, $t_6-t_5$, indicate a time hiatus between different symbols of the same free-draw procedure. For each component of $\vec{p}(t)$, velocity and acceleration values could be calculated according to Eq. 2 and Eq. 3, respectively.

$$\vec{v} = \frac{d\vec{p}}{dt} \text{ where } \vec{p}(t) = \vec{p}_x(t) + \vec{p}_y(t) \tag{1}$$

$$\text{Therefore: } \vec{v} = \vec{v}_{x(t)} + \vec{v}_{y(t)} = \frac{d\vec{p}_{x(t)}}{dt} + \frac{d\vec{p}_{y(t)}}{dt} \tag{2}$$

$$\text{And, } \vec{a} = \vec{a}_{x(t)} + \vec{a}_{y(t)} = \frac{d\vec{v}_{x(t)}}{dt} + \frac{d\vec{v}_{y(t)}}{dt} \tag{3}$$

Figure 5:
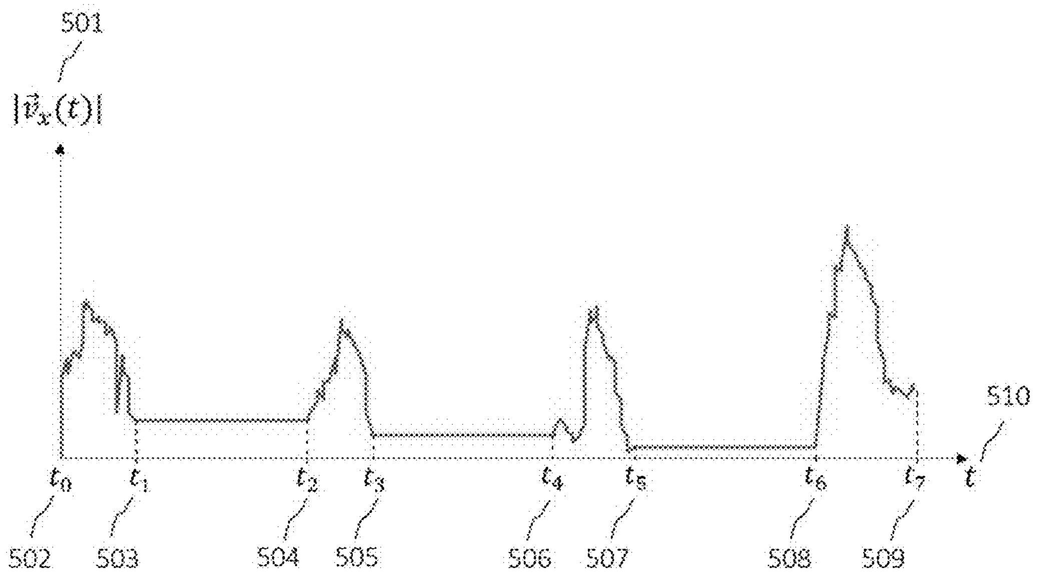
FIG. 5 presents examples of horizontal velocity component values over time of a given draw-signal according to an embodiment of the present invention.
Figure 6:
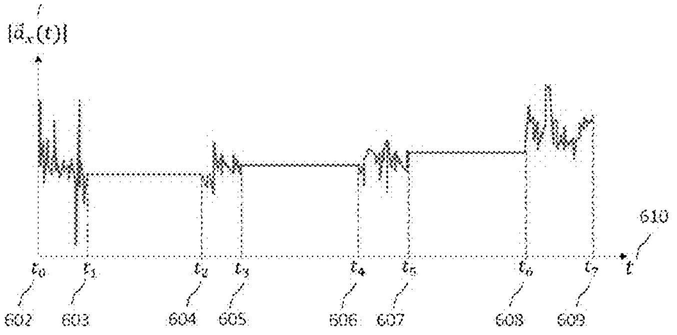
FIG. 6 presents examples of horizontal acceleration component values over time of a given draw-signal according to an embodiment of the present invention.

For illustration purpose, FIG. 5 contains examples of horizontal velocity component values $|\vec{v}_x(t)|$ (501) over time (510) of a given draw-signal and FIG. 6 contains examples of horizontal acceleration component values $|\vec{a}_x(t)|$ (601) over time (610) of the same draw-signal. All other times highlighted in FIGS. 5 (502 to 509) and FIGS. 6 (602 to 609), are equal to those highlighted in FIG. 4, since, as defined, $|\vec{v}_x(t)|$ and $|\vec{a}_x(t)|$ are directly extracted from $\vec{p}(t)$.

Figure 7:
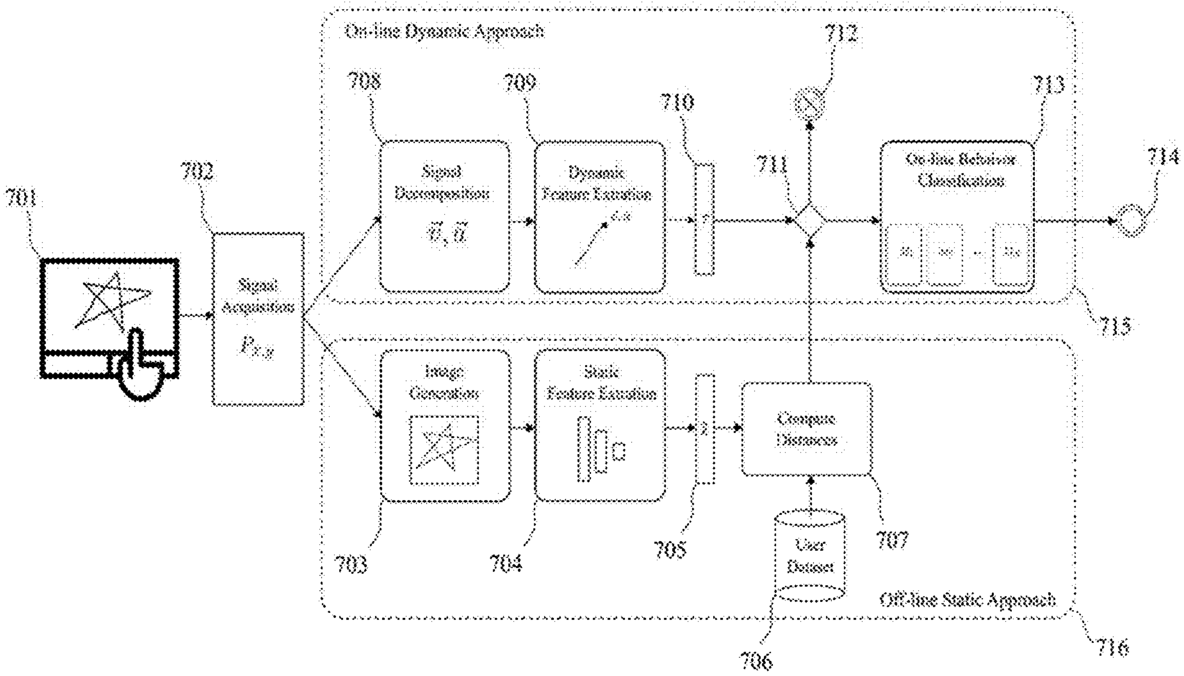
FIG. 7 presents the architecture according to an embodiment of the present invention.

Considering the definitions and scenarios explained hitherto, FIG. 7 is an example of the architecture of the embodiment that will be described herein. From the acquisition of the signal $\vec{p}(t)$ (702) using a sensible interactive surface (701) we can combine two types of approach: Off-line Static Approach (716) and On-line Dynamic Approach (715). In the Off-line Static Approach (716), firstly the image generation (703) is performed to create a visual representation of the signal $\vec{p}(t)$. For example, the signal $\vec{p}(t)$ (702) could be projected in the image plane and a deep metric learning neural network model (DML) could be used to extract an embedded vector (705) in the visual features space. For On-line Dynamic Approach (715), it is possible to apply a signal decomposition process (708) and dynamic feature extraction (709) to obtain a feature vector that registers the users' movement behavior (710). Another way for obtaining this vector (710) could be using a learning approach for a trained model to capture the dynamic features of the signal.

By utilizing the embedded visual vectors (710), we can compare (711) the present authentication subject with the dataset of users previously registered in the system (706). For instance, if the computed distance (707) to the closest user is less than a predefined threshold, that could be calculated during the model training process based in a convenient heuristic strategy (i.e., equal error rate (EER) threshold point where the false rejection rate (FRR) is equal to the false acceptance rate (FAR)) or even arbitrary chosen, we can proceed to select a binary model for classifying the user (713) using the dynamic feature vector (710). Otherwise, the authentication subject is rejected (712). Finally, the binary selected model Mi decides if the subject that is being authenticated in the system is a legit user or not (714).

On-Line Dynamic Approach

The On-line Dynamic Approach component (block (715) in FIG. 7) can operate in accordance with one or more implementations. One possible implementation is making a signal decomposition (708) of the original signal acquired in the acquisition process (702) into vertical and horizontal components and, afterwards, calculate velocity (v) and acceleration (a) derived signals for each component. From these signals, it is possible to extract discriminative dynamic features that can be used to train a classifier.

Considering that in a real scenario the acquired P(x,y) points, for a given drawn, is a discrete sequence of points over time, all acquired P(x,y) can be sequentially concatenated to compose a discrete vector $P_{x,y}[n]$, where n is an integer number that indicates the nth term in the sequence. Consequently, as can be seen in FIG. 7, $P_{x,y}[n]$ could be decomposed in horizontal ($P_x[n]$) and vertical ($P_y[n]$) components. From the signal decomposition, a set of dynamic features can be extracted to record the dynamics of the movement (709). From $P_{x,y}[n]$, it is possible to define $V_x[n]$ as the sequence of numbers representing all calculated values of velocity horizontal component for a given specific draw according to Eq. 2, where n is an integer number that indicates the nth term in the sequence. Similarly, let $V_y[n]$ be the values of velocity vertical components, and $A_x[n]$ and $A_y[n]$ the values of calculated horizontal and vertical acceleration components according to Eq. 3, respectively.

After $P_{x,y}[n]$ decomposition into $P_x[n]$ and $P_y[n]$, and the calculation and assembly of $V_x[n]$, $V_y[n]$, $A_x[n]$, and $A_y[n]$, the next step could be to extract the features that could be used to train and test a classifier.

For each one of the aforementioned vectors, we may consider to calculate, among others, mean, variance (var), energy (E), and dynamic time warping distance (dtw). Furthermore, the length of the entire signal, the number of times the user remove and put again the finger on the touchpad for the same drawn symbol (hiatus) and the total time duration of the drawing process in milliseconds could also be used as dynamic features. Afterwards, a dynamic feature vector τ (710) can be created combined these features. For example, it is possible to define the vector $\tau \in \mathbb{R}^{27}$ such as:

$$\begin{aligned}\tau = (&\overline{P}_x, \mathrm{var}(P_x), EP_x, dtw(P_x), \ldots\\ &\overline{P}_y, \mathrm{var}(P_y), EP_y, dtw(P_y), \ldots\\ &\overline{V}_x, \mathrm{var}(V_x), EV_x, dtw(V_x), \ldots\\ &\overline{V}_y, \mathrm{var}(V_y), EV_y, dtw(V_y), \ldots\\ &\overline{A}_x, \mathrm{var}(A_x), EA_x, dtw(A_x), \ldots\\ &\overline{A}_y, \mathrm{var}(A_y), EA_y, dtw(A_y), \ldots\\ &\text{hiatus, length, time})\end{aligned} \tag{4}$$

The dynamic feature vector τ (710) could be used as input to train classification models specialized for each user (713). Many classifiers could be considered for the classification based on on-line dynamic approach, such as Random Forest, K-Nearest Neighbors, Multi-layer Perceptron, Support Vector Machine, XGBoost, and others.

Off-Line Static Approach

Figure 8:
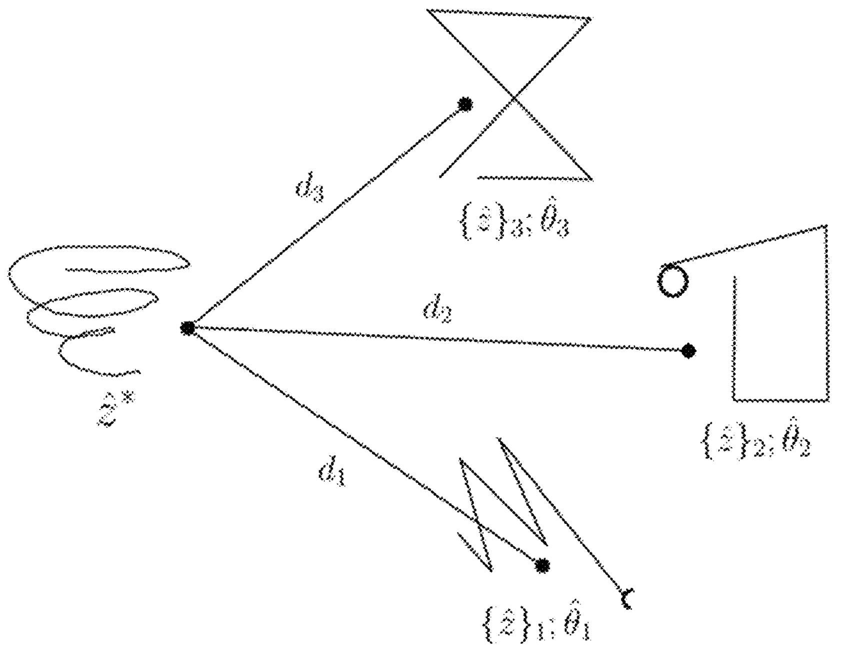
FIG. 8 presents examples of the different free-drawn symbols according to an embodiment of the present invention.

Based on all P(x,y) points acquired for each one of the drawn symbols, it is possible to generate a corresponding image for each symbol. For obtaining the image, a valid implementation of block (703) in FIG. 7, could be to simplify the vectors, remove the timing information, and positioned and scaled the data into a W×H region similar to propose in J. Jongejan, H. Rowley, T. Kawashima, J. Kim, and N. Fox-Gieg, "The quick, draw!-ai experiment," Mount View, CA, accessed Feb, vol. 17, no. 2018, p. 4, 2016. FIG. 8 shows 40 examples (801) that could be obtained applying this method.

Given the symbol image I obtained in the step before, the objective is to classify and represent I using a static approach. For this task, we could be training two ConvNet PreActResNet-18 and ConvNetXt-tiny, which have been shown to produce good results in visual representation problems. We use the BCE (Binary Cross Entropy) loss function for the classification task and the Fully Convolutional Network (FCN) for training embedded spaces using Triplet Loss model for the retrieval task.

Triplet Loss is trained using the triplet data configuration $$I_n^{(i)}, I_p^{(i)}, I_n^{(i)}$$

where $$I_a^{(i)}, I_p^{(i)}$$

have the same class labels and $$I_a^{(i)}, I_n^{(i)}$$

have different class labels. Training process drives the network to find an embedding space where the distance between $$I_a^{(i)} \text{ and } I_n^{(i)}$$

is larger than the distance between $$I_a^{(i)} \text{ and } I_p^{(i)}$$

plus the margin parameter $\alpha$. Let $\Delta_{ia,ip}$ denote the distance between normalized anchor and positive features and $\Delta_{ia,in}$ denote the distance between normalized anchor and negative features, computed using L2 distance, that is $\Delta_{ia,ip}=\|f(I_a^{(i)})-f(I_p^{(i)})\|_2$ and $\Delta_{ia,in}=\|f(I_a^{(i)})-f(I_n^{(i)})\|_2$. There are various ways to compute triplet loss. The most commonly used is the Hinge Loss function, with a hyper-parameter margin $\alpha$. The loss function is expressed as:

$$\mathcal{L} = 3/2B\sum\left(\text{from } i = 1 \text{ to } \frac{B}{3}\right)\left[\Delta^2_{\{ia,ip\}} - \Delta^2_{\{ia,in\}} + \alpha\right]+ \quad (5)$$

where B stands for the number of images in the batch, $f(\cdot)$ is a FCN. The $[\cdot]+$ operation indicates the hinge function $\max(0,\cdot)$.

First Embodiment—User Identification

Let $$K = \{K_i = (S_i, I_i)\}_{i=1}^{M}$$

be the set of M samples pairs corresponding to U possible users and $$Y = \{y_i\}_{i=1}^{M}$$

be their respective user identify. Each sample $K_i$ consists of a draw in raster pixel space $I_i$ and a corresponding segment draw $S_i$. Let $g_{\hat\theta_i}$: $S_i \rightarrow \{0,1\}$ be the dynamic function, of parameters $\hat\theta_i$, for analysis of the correspondence of $S_i \rightarrow u_i \in U$. Let $f_\Theta$: $R^D \rightarrow R^d$ be the Off-line Static function that builds a representation $\hat z \in R^d$ for a sample image $I_i \in R^D$, (e.g., D=32×32 pixels) in an embedded space of reduced the dimension $R^d$.

Figure 9:
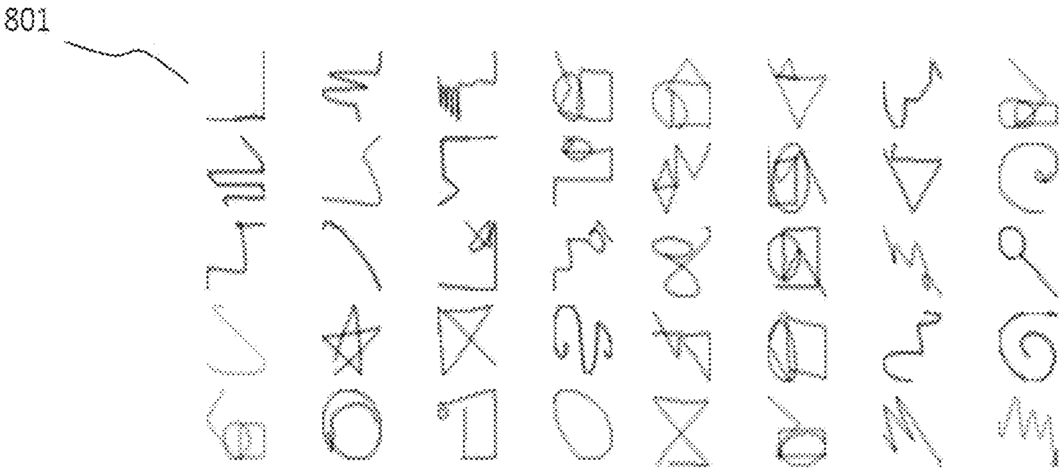
FIG. 9 presents a conceptual example to illustrate the decision processes in user recognition according to an embodiment of the present invention.
Figure 10:
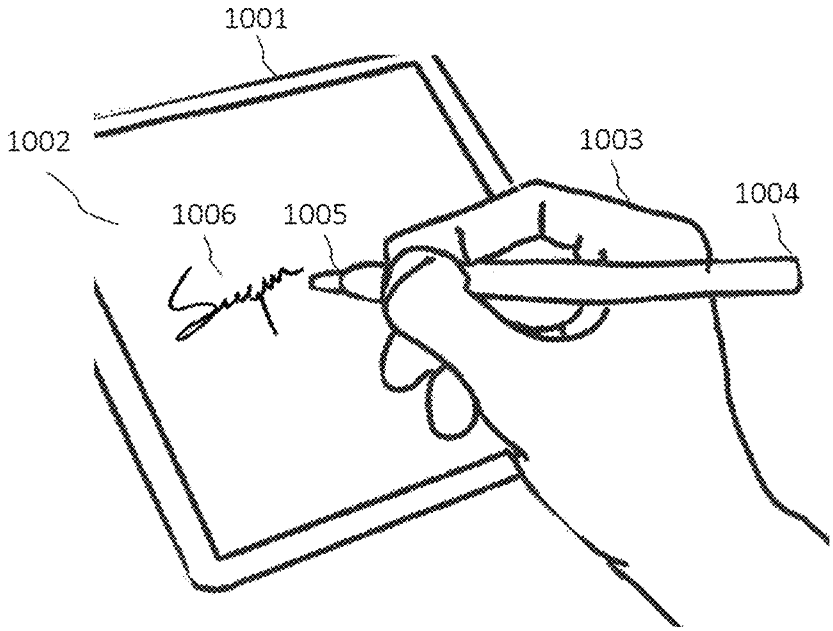
FIG. 10 presents a conceptual example to illustrate an alternative embodiment of the present invention.

Since we could define two approaches (dynamic and static) we could define the function $\Pi$: $k \rightarrow \{0,1\}$ with $k \in K$ that combines on-line dynamic approach $g_{\hat\theta_i}$ (713) with off-line static approach $f_\Theta$ (704) for user recognition purpose. For this example, we assume that '1' represents the positive output of the classifier. Given a new user to be identified u*, his respective sample k*=(S*, I*), and the set of the features embedded $Z=\{\hat z_i=f_\Theta(I_i)|\hat z_i \in R^d\}$ for the registered users, a way to combine these two approaches would be:

$$\prod(k^*) = \arg\min\left[0, (\Delta_{\hat\imath}(I^*) - \varepsilon) \times g_{\theta_k}(S^*)\right], \quad (6)$$

$$\text{with } \Delta_{\hat\imath}(I) = \arg\min_{i\in\{1,\ldots,M\}} \|f_\theta(I) - \hat z_i\|_2^2, \quad (7)$$

where the operator $\Delta_{\hat\imath}(I)$ returns the index $\hat\imath$ and the smallest distance between the image corresponding to the new user u* and the registered images from users in Z, and $\varepsilon$ is the shortest distance accepted to identify a user. FIG. 9 shows a conceptual example of one way of implementing the decision process in user recognition.

In addition to the best mode, this invention has at least six other possible embodiments, as will be described.

2nd Embodiment—Static Off-Line User Authentication

Based in the invention described in this document, it is possible to apply the method to perform user authentication procedures based only on image pattern similarity (off-line static approach), based on the matching between a pre-registered draw registered to the system and an actual draw that is being presented.

This embodiment can be formalized as a variation of the user identification method defined in Eq. 6. Given a user to be authenticated who claims to be the user $u_{\hat\imath} \in U$, with his respective identity $y_{\hat\imath} \in Y$, and sample k*=(S*, I*)∈K and $Z=\{\hat z_{\hat\imath}=f_\Theta(I_{\hat\imath})|\hat z_{\hat\imath} \in R^d\}$ be the set of the features embedded for the registered users, a way to authenticate the given user would be:

$$\prod(k^*, \hat\imath) = \arg\min\left[0, \left(\|f_\Theta(I^*) - \hat z_{\hat\imath}\|_2^2 - \varepsilon\right)\right], \quad (8)$$

where $\Pi(k^*, \hat\imath)=1$ if authentication procedure for the user $u_{\hat\imath}$ succeeds, or 0 if it fails.

3rd Embodiment—Dynamic On-Line User Authentication

Based in the invention described in this document, it is possible to apply the method to perform user authentication procedures based only on the user's unconstrained free-draw behavioral trait (as on-line dynamic approach), based on the dynamic analysis of users' unique behavior while manipulating the interactive surface in which the free drawing process is being made.

As well as the 2nd embodiment, this embodiment can be formalized as a variation of the user identification method defined in Eq. 6. Given a user to be authenticated who claims to be the user $u_{\hat\imath} \in U$, with his respective identity $y_{\hat\imath} \in Y$ and sample k*=(S*, I*)∈K, and $Z=\{\hat z_{\hat\imath}=f_\Theta(I_{\hat\imath})|\hat z_{\hat\imath} \in R^d\}$ be the set of the features embedded for the registered users, a way to authenticate the given user would be:

$$\prod(k^*, \hat\imath) = g_{\hat\theta_{\hat\imath}}(S^*), \quad (9)$$

where $\Pi(k^*, \hat\imath)=1$ if authentication procedure for the user $u_{\hat\imath}$ succeeds, or 0 if it fails, and $g_\theta\hat\imath$: Si→{0,1}.

4th Embodiment—Combined Static Off-Line and Dynamic On-Line User Authentication

Based in the invention described in this document, in is possible to apply the method to perform user authentication procedures combining both approaches.

As well as the 2nd and 3rd embodiment, this embodiment can be formalized as a variation of the user identification method defined in Eq. 6. Given a user to be authenticated who claims to be the user $u_{\hat\imath} \in U$, with his respective identity $y_{\hat\imath} \in Y$ and sample k*=(S*, I*)∈K, and $Z=\{\hat z_{\hat\imath}=f_\Theta(I_i)|\hat z_{\hat\imath} \in R^d\}$ be the set of the features embedded for the registered users, a way to authenticate the given user would be:

$$\prod(k^*, \hat\imath) = \arg\min\left[0, \left(\|f_\Theta(I^*) - \hat z_{\hat\imath}\|_2^2 - \varepsilon\right) \times g_{\hat\theta_{\hat\imath}}(S^*)\right], \quad (10)$$

being $\Pi(k^*, \hat{\imath})=1$ if authentication procedure for the user $u_i$ succeeds, or 0 if it fails.

5th Embodiment—Continuous Authentication

This embodiment can be formalized as a variation of the user identification method defined in Eq. 6. For this embodiment, given a user $u_i \in U$ already authenticated by any previous procedure with a verified identity $y_{\hat{\imath}}$, we may define a function $\zeta(t, k^*)$, which continuously authenticate $u_{\hat{\imath}}$, over the time t, based on the periodic evaluation of $\Pi(k^*)$, over time intervals multiple of T. Let $$R = \{R_i = (S_{r_i}, I_{r_i})\}_{i=1}^{N}$$

be a set of N sample pairs corresponding to N previous free-draw of $u_{\hat{\imath}}$ known to the system, $k^*=(S^*, I^*)$ a given new sample input to the system at a time t, and $Z=\{\hat{z}_{\hat{\imath}}=f_\Theta(I_{\hat{\imath}}) | \hat{z}_{\hat{\imath}} \in R^d\}$ be the set of the features embedded for all elements of R. A way to continuously verify the identity of $u_{\hat{\imath}}$ would be:

$$\mathcal{L}(t, k^*) = \prod_{t=T,2T,\ldots}^{T_f} \prod_t (k^*), \tag{11}$$

$$\prod(k^*) = \arg\min\left[0, (\Delta_{\hat{\imath}}(I_{r_t}) - \varepsilon) \times g_{\hat{\theta}_{\hat{\imath}}}(S_{r_t})\right], \tag{12}$$

$$\Delta_{\hat{\imath}}(I) = \arg \min_{i \in \{1, \ldots, N\}} \left\| f_\Theta(I) - \hat{z}_{\hat{\imath}} \right\|_2^2. \tag{13}$$

being $\zeta(t, k^*)$ always equal to one while the continuous subsequent evaluation of the identity $y_{\hat{\imath}}$ of $u_{\hat{\imath}}$ succeeds during the time interval $T_f$–T, or zero if it fails.

6th Embodiment—On-Line Signature Authentication

This embodiment depicts a possible practical application of the method of described in 4th Embodiment of the document. In this embodiment, a tablet-like device (1001) with an interactive sensible surface (1002) is used. The user's hand (1003) is holding an electronic pen (1004) with a proper electronic point (1005) that is being used to perform a signature in the interactive surface area.

Since a signature may be comprehended as a specific case of what we have define as a free-draw, it is possible to have an sample pair $k_{\hat{\imath}}=(S_{\hat{\imath}}, I_{\hat{\imath}})$, corresponding to a user $u_{\hat{\imath}}$, with an identity $y_{\hat{\imath}}$, and, therefore, apply the method defined in the 4th embodiment to an on-line signature verification procedure normally used to validate electronic contracts when users perform the signature procedure in a tablet-like touch-screens.

The exemplificative embodiments described herein may be implemented using hardware, software, or any combination thereof and may be implemented in one or more computer systems or other processing systems. Additionally, one or more of the steps described in the example embodiments herein may be implemented, at least in part, by machines. Examples of machines that may be useful for performing the operations of the example embodiments herein include general purpose digital computers, client computers, portable computers, mobile communication devices, tablets, smartphones, notebooks or wearable electronic devices, such as smartwatches.

For instance, one illustrative example system for performing the operations of the embodiments herein may include one or more components, such as one or more microprocessors, for performing the arithmetic and/or logical operations required for program execution, and storage media, such as one or more disk drives or memory cards (e.g., flash memory) for program and data storage, and random-access memory, for temporary data and program instruction storage.

Therefore, the present invention is also related to a system authenticating a user comprising a processor and a memory comprising the computer-readable instructions that, when performed by the processor, cause the processor to perform the method steps previously described in this disclosure.

The system may also include software resident on a storage media (e.g., a disk drive or memory card), which, when executed, directs the microprocessor(s) in performing transmission and reception functions. The software may run on an operating system stored on the storage media, such as, for example, UNIX or Windows, Linux, Android, and the like, and can adhere to various protocols such as the Ethernet, ATM, TCP/IP protocols and/or other connection or connectionless protocols.

As well known in the art, microprocessors can run different operating systems and contain different software types, each type being devoted to a different function, such as handling and managing data/information from a particular source or transforming data/information from one format into another format. The embodiments described herein are not to be construed as being limited for use with any particular type of server computer, and any other suitable device for facilitating the exchange and storage of information may be employed instead.

Software embodiments of the illustrative example embodiments presented herein may be provided as a computer program product or software that may include an article of manufacture on a machine-accessible or non-transitory computer-readable medium (also referred to as "machine-readable medium") having instructions. The instructions on the machine-accessible or machine-readable medium may be used to program a computer system or other electronic device. The machine-readable medium may include, but is not limited to, floppy diskettes, optical disks, CD-ROMs, magneto-optical disks, solid-state flash memory or another type of media/machine-readable medium suitable for storing or transmitting electronic instructions.

Therefore, the present invention also relates to a non-transitory computer-readable storage medium for authenticating a user, comprising computer-readable instructions that, when performed by the processor, cause the processor to perform the method steps previously described in this disclosure.

The techniques described herein are not limited to any particular software configuration. They may be applicable in any computing or processing environment. The terms "machine-accessible medium," "machine-readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software in one form or another (e.g., program, procedure, process, application, module, unit, logic, and so on) as taking action or causing a result. Such expressions are merely a shorthand way of stating that the execution of the software by a processing system causes the processor to act to produce a result.

Effect

As seen in the description above, the effect of our proposal is to offer a new method to identify and authenticate users based on free-draw procedures. For this, a set of experiments were conducted and various static off-line and dynamic on-line classifiers were trained and tested. As already explained, although our method could be applied to any computing device with an interactive sensible surface sensible to touch, for our experiments, we the following examples are based on the embodiments comprising touch-pads from laptop computing devices. From now on, this whole section describes in detail the experiments scenarios and their correspondent results. As a glimpse of the results, we inform in advance that by combining our classifiers as described in Eq. 6, we were able to reach an FRR rate of about 1% and an impressive FAR rate of 0%, when applying our solution on a data set of 4800 samples, being 960 samples being used to test the proposed method and generate the cited results.

From now on, it will be presented the acquisition protocol used during the data collection as well as a set of results for four different proposed experiments. All results were generated based on the methods previously described. To organize the results for the different scenarios, experiments were divided into three groups: (1) Classification results to evaluate the performance of the method based on online dynamic and offline static approaches; (2) Representation and recover results to analyze the representation space for retrieval problem; and (3) User identification results, that combines the best strategies of the on-line and off-line approaches to address the problem of free-drawn symbol identification which is resistant to simple reproduction attacks.

Figure 11:
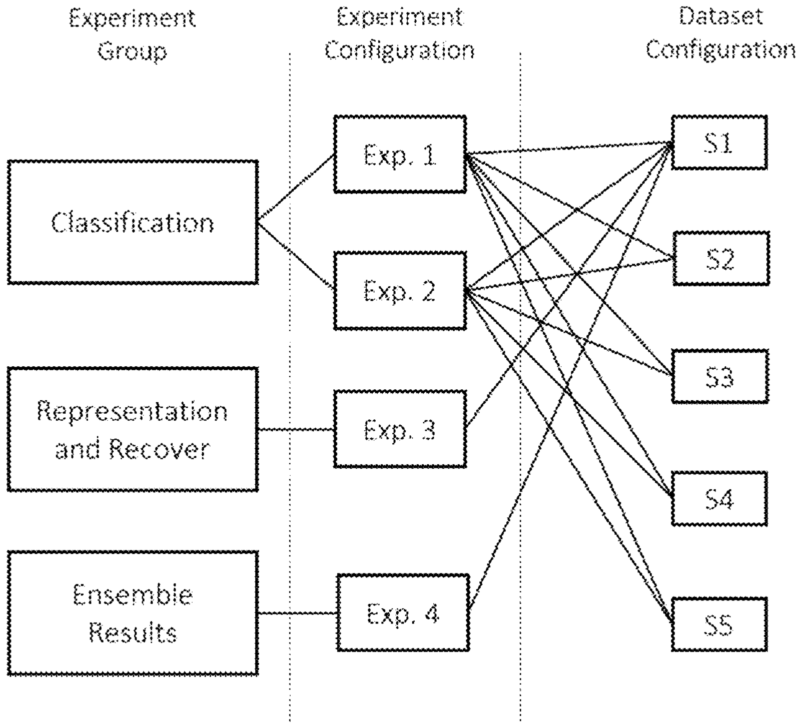
FIGS. 11 to 15 present a set of figures, diagrams and tables related to the conducted experiments and results according to an embodiment of the present invention.

Additionally, to validate our method, a dataset composed of data from two different sessions was used. Depending on the group and experiment conducted, a different dataset configuration is used. In FIG. 11, it is shown the relation between groups, experiments, and dataset configuration and in Table 2 it is presented how the acquired data from both sessions are divided into five different configurations (S1, S2, S3, S4, and S5). Complete details on the dataset and results can be found in the next sections.

TABLE 2

The approach for each subset experiment. These experiments were conducted to assert the performance of the models.

| Subset | Training | Testing |
|---|---|---|
| S1 | Both Sessions | 20% of dataset |
| S2 | Session 1 | Session 2 |
| S3 | Session 2 | Session 1 |
| S4 | Session 1 | 20% of dataset |
| S5 | Session 2 | 20% of dataset |

Dataset

To evaluate the proposed method, a dataset was created. In this work, we propose to study scenarios where individuals could use different laptops in different angles. These scenarios aim to represent real use cases, since it is relatively common for individuals to use the computer at a certain angle using a stand, and this could influence their behavior while manipulating the touch-pad. The angles defined to be used in our experiments were: 0°, 20° and 40°, since they represent common daily usage situations. An adjustable laptop stand was used to adjust the laptop angle.

A protocol for conducting this data acquisition experiment was defined. Each individual would draw 4 symbols in two different laptops' touch-pads, repeating each symbol 10 times for each of the angles defined. To measure the stand/laptop angle, gyroscope signal obtained from a smartphone running a custom Android application was used.

The individuals freely defined 3 symbols without any restriction, and a 4th symbol was defined as a universal symbol, which needs to be drawn by every individual. The individuals were instructed to always repeat the same drawing orientation for the same symbol, which means all the straight lines and curves needs to be executed in the same way they were conceived, in every repetition. At the end of the acquisition session, a total of 2400 samples were acquired from 10 individuals, drawing 4 symbols, 10 times each, in 3 different angles on 2 different laptops.

In order to collect more data and to assert unbiased drawings, it was executed the same data collection in two different sessions, with an interval of 20 days between each, resulting in a total of 4800 samples. Throughout this work, the first data collection will be referred as Session 1 and the second will be referred as Session 2.

Figure 12:
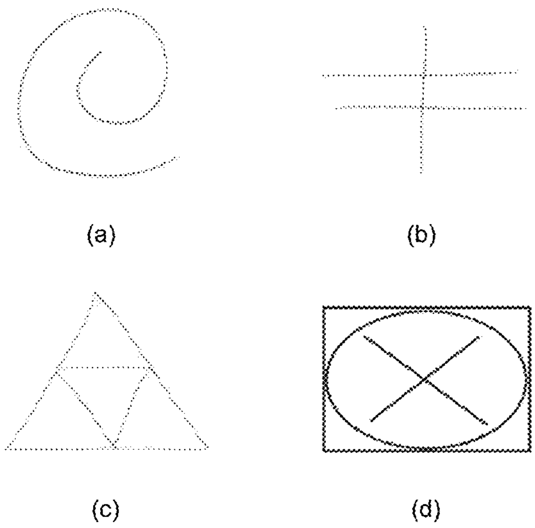

A protocol sheet was used by each individual, intended to register their chosen symbol and also serve as a reference for their drawings to the touch-pad. This sheet of paper has reserved space for 3 symbols, and since the fourth symbol is universal, it is already printed on the sheet. FIG. 12 shows examples of drawings that were made by the subjects. Symbol (d) in FIG. 12 is the Universal Symbol.

Experiments 1 and 2—Classification

A protocol for the classification experiments was also created, and the experiments were named Exp. 1 and Exp. 2. As already shown in FIG. 11, Exp. 1 and Exp. 2 would execute a routine of sub-experiments which will run on five different dataset configuration (Table 2), resulting in a total of 10 sub-experiments. In FIG. 11, it is shown all experiments configurations. For Exp. 1, eight classifiers were trained to be applied to the problem of multi-class touch-pad free-drawn symbol classification.

For the classification based on on-line dynamic approach, Random Forest, K-Nearest Neighbors, Multilayer Perceptron, Support Vector Machine, and XGBoost as well as a classifier ensemble were evaluated.

For the classification based on off-line static approach, we use two ConvNet: PreActResNet-18 and ConvNetXttiny. All neural net models were trained on Nvidia GPUs (RTX A4500) using PyTorch for 60 epochs for the training set with 60 examples per mini batch and employing Adam optimizer. Symbols images were rescaled to 32×32 pixels for PreActResNet-18 and 224×224 pixels for ConvNetXt-tiny.

In summary, Exp. 1 objective is to find best classifier able to correctly classify the 40 different symbols (10 subjects×4 symbols per subject) that composes the dataset. The Experiment 2, however, consists in a binary classification problem, where each symbol is defined as target at a time, and all others defined as non-target. The idea of this experiment is to generate one specialized classifier for each one of the 40 symbols that composes the dataset. For this experiment, only the classifiers based on dynamic features were considered. As expected, Exp. 2 has an unbalanced dataset distribution and, to avoid over-fitting, it was used the synthetic minority over-sampling technique (SMOTE) technique on the trainset. Table 2 and Table 3 show each experiment dataset configuration and each experiment characteristics, respectively. More details related to Exp. 3 and 4 will be found in future sections.

TABLE 3

The Characteristics of Each Experiment.

| Exp. # | Approach | Problem | Data Config. | Nature |
|---|---|---|---|---|
| Exp. 1 | Dyn./Static | Multiclass | S1, S2, S3, S4, S5 | Classification |
| Exp. 2 | Dynamic | Binary | S1, S2, S3, S4, S5 | Classification |
| Exp. 3 | Static | Multiclass | S1 | Retrieval |
| Exp. 4 | Dyn./Static | Binary | S1 | Identification |

For both experiments, to normalize the dynamic features, it was used the default RobustScaler (as seen in http://pytorch.org/). In order to avoid data leakage, the normalization parameters were calculated based only on the train set, and then applied to normalize the test set.

It is presented in Table 4 the achieved results for the Experiment 1, for each classifier and for each sub-set experiment. For the Experiment 2, since we evaluated 40 symbols in a binary fashion for each sub-experiment, it is being presented at Table 5 the best classifier for the symbol that has the best balanced accuracy, as well as the best classifier for the symbol that has the worst balanced accuracy. The mean shown refers to the mean of the accuracy for the entire sub-experiment, considering the best classifier for each symbol.

For Exp. 1, for all dataset configurations (S1 to S5), the classifiers ensemble outperforms all other single classifiers based on dynamic features. For S1 and S4, the static approach classifiers (PreActResNet and ConvNetXt) perform as well as the dynamic classifiers ensemble, and for S5 the ensemble slightly outperforms PreActResNet and ConvNetXt. It should be highlighted that for S2 and S3, as expected, the static classifiers outperform the dynamic ones, since the users' behavior is more likely to change between different acquisition sessions than the drawn symbol itself.

TABLE 4

Classifiers Results for All Subsets. Experiment 1

| Sub | Classifier | Precision | Recall | F1s | Acc. |
|---|---|---|---|---|---|
| S1 | RF | 0.9853 | 0.9844 | 0.9842 | 0.9844 |
| | KNN | 0.9136 | 0.9094 | 0.9094 | 0.9094 |
| | MLP | 0.9707 | 0.9688 | 0.9687 | 0.9688 |
| | SVM | 0.9712 | 0.9698 | 0.9698 | 0.9698 |
| | XGBoost | 0.9679 | 0.9656 | 0.9657 | 0.9656 |
| | Ensemble | 0.9890 | 0.9885 | 0.9885 | 0.9885 |
| | PreActResNet | 0.9970 | 0.9968 | 0.9969 | 0.9968 |
| | ConvNetXt | 0.9938 | 0.9937 | 0.9938 | 0.9937 |
| S2 | RF | 0.9483 | 0.9412 | 0.9410 | 0.9413 |
| | KNN | 0.8016 | 0.7829 | 0.7840 | 0.7829 |
| | MLP | 0.8647 | 0.8458 | 0.8449 | 0.8458 |
| | SVM | 0.9037 | 0.8867 | 0.8857 | 0.8867 |
| | XGBoost | 0.8895 | 0.8733 | 0.8733 | 0.8733 |
| | Ensemble | 0.9401 | 0.9338 | 0.9336 | 0.9337 |
| | PreActResNet | 0.9979 | 0.9979 | 0.9979 | 0.9979 |
| | ConvNetXt | 0.9765 | 0.9754 | 0.9759 | 0.9754 |
| S3 | RF | 0.9300 | 0.9217 | 0.9215 | 0.9217 |
| | KNN | 0.7899 | 0.7792 | 0.7781 | 0.7792 |
| | MLP | 0.8638 | 0.8496 | 0.8454 | 0.8496 |
| | SVM | 0.8810 | 0.8704 | 0.8691 | 0.8704 |
| | XGBoost | 0.8902 | 0.8812 | 0.8806 | 0.8812 |
| | Ensemble | 0.9236 | 0.9150 | 0.9139 | 0.9150 |
| | PreActResNet | 0.9817 | 0.9808 | 0.9812 | 0.9808 |
| | ConvNetXt | 0.9784 | 0.9775 | 0.9779 | 0.9775 |

TABLE 4-continued

Classifiers Results for All Subsets. Experiment 1

| Sub | Classifier | Precision | Recall | F1s | Acc. |
|---|---|---|---|---|---|
| S4 | RF | 0.9840 | 0.9812 | 0.9816 | 0.9812 |
| | KNN | 0.8858 | 0.8771 | 0.8763 | 0.8771 |
| | MLP | 0.9454 | 0.9396 | 0.9396 | 0.9396 |
| | SVM | 0.9505 | 0.9458 | 0.9462 | 0.9458 |
| | XGBoost | 0.9709 | 0.9667 | 0.9671 | 0.9667 |
| | Ensemble | 0.9796 | 0.9771 | 0.9771 | 0.9771 |
| | PreActResNet | 0.9875 | 0.9854 | 0.9865 | 0.9854 |
| | ConvNetXt | 0.9887 | 0.9875 | 0.9881 | 0.9875 |
| S5 | RF | 0.9901 | 0.9896 | 0.9896 | 0.9896 |
| | KNN | 0.8986 | 0.8854 | 0.8866 | 0.8854 |
| | MLP | 0.9641 | 0.9625 | 0.9621 | 0.9625 |
| | SVM | 0.9589 | 0.9542 | 0.9550 | 0.9542 |
| | XGBoost | 0.9744 | 0.9729 | 0.9726 | 0.9729 |
| | Ensemble | 0.9942 | 0.9938 | 0.9937 | 0.9938 |
| | PreActResNet | 0.9898 | 0.9895 | 0.9897 | 0.9895 |
| | ConvNetXt | 0.9880 | 0.9854 | 0.9867 | 0.9854 |

TABLE 5

Binary Classifiers Results for All Subsets. Experiment 2

| Sub | Scenario | User | Symbol | Classifier | Acc. |
|---|---|---|---|---|---|
| S1 | best case | 1 | 1 | Ensemble | 1.0 |
| | worst case | 4 | 3 | KNN | 0.97 |
| | | | | S1 Mean | 0.99 |
| S2 | best case | 1 | 1 | Ensemble | 1.0 |
| | worst case | 6 | 4 | KNN | 0.82 |
| | | | | S2 Mean | 0.97 |
| S3 | best case | 1 | 1 | KNN | 1.0 |
| | worst case | 5 | 1 | KNN | 0.88 |
| | | | | S3 Mean | 0.96 |
| S4 | best case | 1 | 1 | Ensemble | 1.0 |
| | worst case | 1 | 3 | Ensemble | 0.95 |
| | | | | S4 Mean | 0.99 |
| S5 | best case | 1 | 1 | Ensemble | 1.0 |
| | worst case | 6 | 4 | Ensemble | 0.95 |
| | | | | S5 Mean | 0.99 |

Experiment 3—Representation and Recovery

The current study employs the Recall@K metric to evaluate the performance of the retrieval task. Specifically, each test image, serving as a query, undergoes a K Nearest Neighbour (KNN) search against the test set, yielding K nearest neighbors. Subsequently, the query is assigned a score of 1 if one of the KNN pertains to the same class as the query and 0 otherwise. The Recall@K metric averages the obtained scores across all test images. Furthermore, the study assesses the accuracy of the retrieval task by computing the fraction of retrieved results that belong to the same class as the query, averaged across all queries. The classification task is evaluated via KNN.

Figure 13:
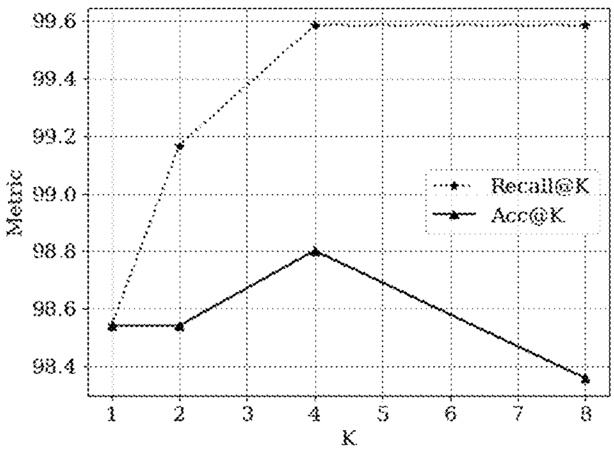
Figure 14:
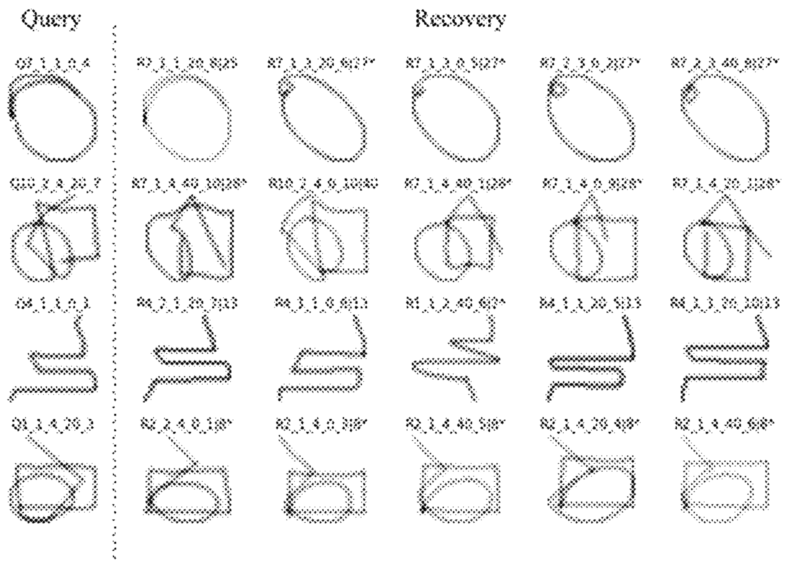

FIG. 13 shows the results obtained in the recovery task (Recall@K and Acc@K measures) for K={1, 2, 4, 8}. The results of our experiments demonstrate that the best performance is achieved when k=4, with an Acc@K of 98.8% and Recall@K of 99.6%. These findings indicate that obtaining high-quality representations in the latent space of symbols is feasible even when there are multiple classes of identical symbols. However, our analysis suggests that relying solely on visual features may not be sufficient to distinguish vectors belonging to classes with similar symbols. As illustrated in FIG. 14, the Universal Symbols (FIG. 12 *d*) is located very close in the representation space, which can lead to confusion, as shown in FIG. 14, rows 2 and 3. Moreover, other user-drawn instances may also be located in proximity to each other in the representation space.

Experiment 4—User Identification Results

To evaluate the performance of the authentication method, we will measure the False Acceptance Rate (FAR) and False Rejection Rate (FRR). FAR measures the rate at which the system incorrectly identifies an unauthorized person as a valid user. A lower FAR is desirable as it indicates that the system is less likely to grant access to unauthorized individuals. Similarly, FRR measures the rate at which the system rejects a valid user incorrectly. A lower FRR is desirable as it indicates that the system is less likely to deny access to authorized individuals.

This final result was obtained for S1 dataset configuration, which is composed by 4800 drawings from 40 different symbols, being 3840 for the train set and 960 used to test our method. In this experiment, we combine the approaches already explored in Exp. 2 and Exp. 3. First of all, a query recovery with a threshold of 0.56 being used as a rejection parameter is made on the test set for each one of the 960 samples. The threshold value, which is the shortest distance on embedded space accepted to authenticate a user, was chosen based on the equal error rate. After the static approach classification, the best binary classifier, for each corresponding symbol, trained in Exp. 2 is used to validate the user selection employing the dynamic analysis.

Figure 15:
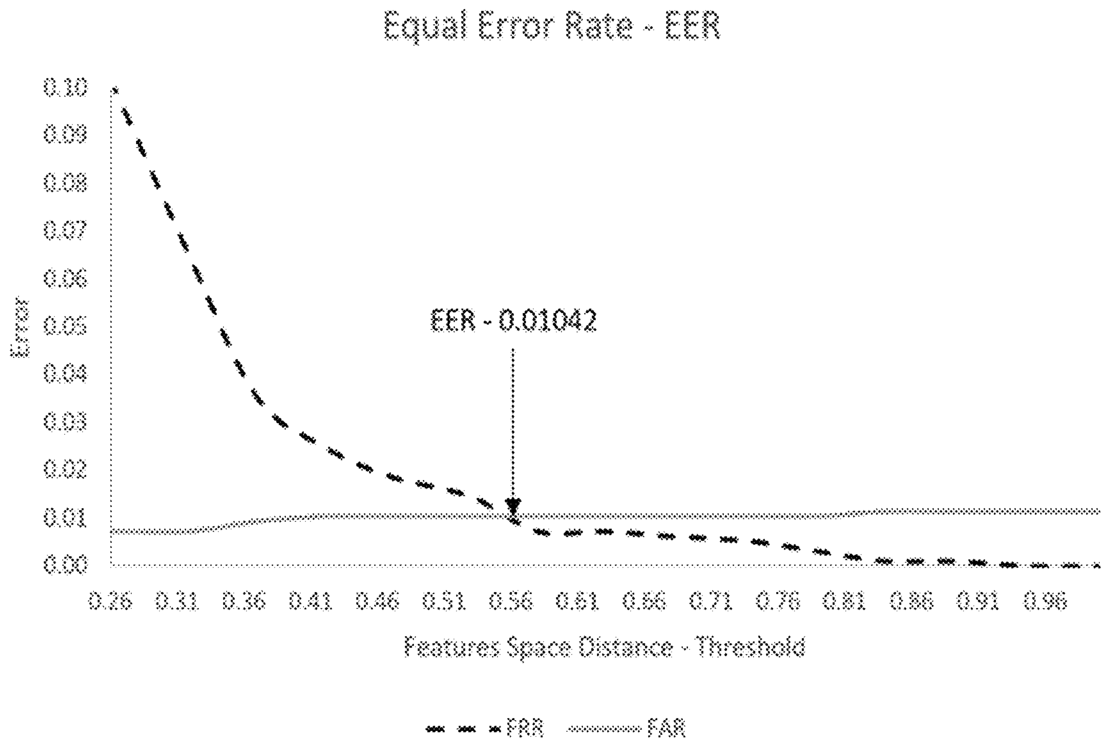

By combining the static and dynamic approaches to identify free-drawn symbols, and therefore users, our method was applied to all 960 samples that composes the test set. In FIG. 15, it is presented the ERR value (0.01042) obtained only by static off-line classifier.

By combining the on-line dynamic classifier, the FRR value slightly increase to 0.01250 (only two more misclassified symbols between the 960 samples), but FAR becomes zero. These results show that the proposed method was capable of completely avoid false positives, maintaining the FRR around 1%, which is a very promising result for authentication purposes.

As seen in the present disclosure, the present invention proposes a method to recognize and authenticate users based on free drawings/symbols made on interactive surfaces of computing devices. The proposed method uses as input signals acquired by the interactive surface sensor during the unconstrained movement of the users' fingers (or any other proper object such as electronic pens). The signals undergo an analysis through two complementary approaches: offline static and online dynamic. In the offline static analysis, visual features are extracted by projecting the signal onto the image plane. This enables a meticulous examination of the signal's characteristics, independent of real-time user interaction. In contrast, the online dynamic analysis capitalizes on users' behavior as they interact with the interactive surface during the free drawing process. This approach focuses on the signal's behavior evaluation, taking into account the users' behavioral traits while manipulation the interactive surface. By integrating these two approaches, a comprehensive analysis of the signals is achieved, offering insights into their visual attributes and understanding users' behavior throughout the interactive drawing procedure for identification purposes. The idea of combining static and dynamic methods is applied to ensure that even if identical forms are drawn (i.e., attempted attack), the users' drawing behavior would be unique enough to correctly distinguish them from each other or even from an impostor.

Our method uses as input signals generated by user's manipulation of an interactive sensible surface during an unconstrained free-draw process.

Each acquired signal related to a free-draw process is a temporal series with the value of horizontal and vertical coordinates of each activated point of the interactive surface over time.

The unconstrained free-draw process may generate signals related to complex personalized drawings.

The input raw signals are decomposed into velocity and acceleration vectors which will be used to extract dynamic features for future user's behavior pattern recognition.

The input raw signals are also used to generate a correspondent image which is the visual representation of the drawn symbol on the interactive surface.

An off-line approach to perform users' identification and authentication which uses image pattern similarity based on the matching between a pre-registered draw registered to the system and an actual draw the is presented.

An on-line approach based on user unconstrained free-draw behavioral trait which uses dynamic analysis of users' unique behavior while manipulating the interactive surface in which the free drawing process is being made is also presented.

A set of ways to combine the off-line and on-line aforementioned approaches was also presented. The combination of these two approaches intend to offer a method for user's recognition based on unconstrained free-drawn procedures made on interactive surfaces of computing devices which is resistant to simple reproduction attacks.

Besides from the aforementioned user's recognition procedures, we also present alternatives embodiments to perform user's authentication based on the off-line and on-line approaches.

Therefore, the proposed invention proposes a solution that is not found in the prior art. Although recent works have already addressed the idea to explore the way in which an individual manipulates interactive surfaces as a unique behavior that could be used for individuals authentication purpose, none of them propose a method to recognize individuals based on the unconstrained free drawing procedure performed on interactive surfaces sensible to touch using a combination of off-line static and on-line dynamic approaches. In a more specific way, our invention has at least the following innovations and strengths:

The proposed invention proposes a new method to recognize individuals that uses two complementary approaches: a) image pattern similarity (off-line static approach), based on the matching between a pre-registered draw registered to the system and an actual draw that is being presented; and b) user unconstrained free-draw behavioral trait (on-line dynamic approach), based on the dynamic analysis of users' unique behavior while manipulating the interactive surface in which the free drawing procedure is being made.

Moreover, the invention proposes a method that works on any computing device (e.g., laptop, smartphone, smartwatch, and others), which has an interactive surface sensible to touch (or electronic pen) in which a free-draw procedure could be made.

In addition, the embodiments of the present invention works with complex draw patterns composed by more than one symbol as part of the same draw procedure.

Still, the present invention combines a convolutional neural networks multiclass approach with a set of good old fashion artificial intelligence classifiers to, based of free-draw procedures, offer a function and five variants capable to perform:

Individual recognition based on dynamic and static features (best mode).

Individual authentication based on static features (2nd Embodiment).

Individual authentication based on dynamic features (3rd Embodiment).

Individual authentication based on dynamic and static features (4th Embodiment).

Individual continuous authentication based on dynamic and static features (5th Embodiment).

Individual authentication based on on-line signature verification (6th Embodiment).

While various exemplary embodiments have been described above, it should be understood that they have been presented by example, not limitation. It is apparent to persons skilled in the relevant art(s) that various changes in form and detail can be made therein.

What is claimed is:

1. A method of identifying a user, comprising:

acquiring a signal representing a drawing input generated by an unconstrained movement of the user on an interactive surface;

generating an image that corresponds to the signal;

extracting static features from the image to generate an embedded vector;

processing the signal by applying a dynamic feature extraction on the signal that registers a movement behavior of the user to generate a user behavior vector; and identifying the user by comparing the image with an identification image representing an identification drawing previously stored in association with the user, the comparing of the image with the identification image previously stored in association with the user that represents the identification drawing further includes computing a distance between the embedded vector and a plurality of template images stored in a dataset, the plurality of template images including an identification image previously acquired from the user for identification where the computed distance is below a predefined threshold;

selecting a binary classification model with the user behavior vector, the binary classification model being a machine learning model trained to authenticate the user with behaviors vectors representative of movement behaviors; and comparing, with the binary classification model, the user behavior vector with a previously user behavior vector associated with the identification drawing.

2. The method according to claim 1, wherein the acquiring of the signal representing the identification drawing input further comprises:

registering a raw time series related to a drawing procedure generated by the unconstrained movement of the user while inserting the drawing input, wherein the raw time series comprises values of coordinates of each point of the interactive surface that is activated along the unconstrained movement of the user over time.

3. The method according to claim 2, wherein the image that corresponds to the signal is generated with basis on a raw time series signal and further comprises removing time information, positioning and scaling data into a plane of two dimension.

4. The method according to claim 1, wherein the generating of the image that corresponds to the signal further comprises projecting the signal in an image plane.

5. The method according to claim 4, wherein the embedded vector is extracted in a visual features space with a deep learning neural network model (DML).

6. The method according to claim 5, wherein the image is stored in the dataset.

7. The method according to claim 6, wherein the distance is computed with an off-line static function, $f_\Theta$, that evaluates an image representation from a descriptor of a given user in relation to all images that are representations of many users that compose the dataset.

8. The method according to claim 1, wherein the comparing the image with the identification image previously stored in association with the user that represents the identification drawing is performed with two convolutional networks ConvNet PreActResNet-18 and ConvNetXt-tiny, a Binary cross Entropy loss function to classify the image and embedded spaces trained with a Fully Convolutional Network using Triplet Loss model for a retrieval.

9. The method according to claim 3, wherein the processing of the signal to generate the user behavior vector further comprises:

decomposing the signal to extract velocity and acceleration vectors from the raw time series signal.

10. The method according to claim 9, wherein the user behavior vector is created with a combination of a mean, a variance, an energy, and a dynamic time warping distance of the velocity and acceleration vectors, a length of an entire signal, a number of times the user removes and puts again a finger on a touchpad, as the interactive surface, for a same drawn symbol and a total time duration of the drawing process.

11. The method according to claim 10, further comprising training a behavior classification model with the user behavior vector with new dynamic features of the user's drawing input.

12. The method according to claim 1, wherein the comparing of the user behavior vector further comprises:

selecting a behavior classification model from a plurality of behavior classification models for classifying the user based on a dynamic feature vector, wherein each user behavior classification model is associated with a previously stored dynamic feature vector and is configured to compare the dynamic feature vector extracted from the signal with the previously stored dynamic feature vector; and identifying the user with basis on a computed distance and the selected behavior classification model.

13. The method according to claim 12, wherein the distance is computed with an on-line dynamic function, $g_{\hat{\theta}}\hat{\imath}$, that evaluates the dynamic feature vector from a descriptor of the user with respect to the dynamic feature vector stored in a dataset.

14. The method according to claim 13, wherein the identification of the user is made by a function Π, that combines the functions $f_\Theta$ and $g_{\hat{\theta}_i}$, wherein Π is given by:

$$\prod(k^*) = \arg\min\left[0, (\Delta_{\hat{\imath}}(I^*) - \varepsilon) \times g_{\theta_k}(S^*)\right],$$

$$\text{with } \Delta_{\hat{\imath}}(I) = \arg\min_{i \in \{1, \ldots, M\}} \|f_\theta(I) - \hat{z}_i\|_2^2,$$

wherein an operator $\Delta_{\hat{\iota}}(I)$ returns an index $\hat{\iota}$ and a smallest distance between the image corresponding to a new user u* and registered images from users in Z, and ε is a shortest distance accepted to identify a respective user.

15. The method according to claim 14, wherein a predetermined threshold is a minimum feature space distance between the draw input and a plurality of templates.

16. The method according to claim 1, further comprising:

wherein the interactive surface is configured to receive a drawing input by the user, the drawing input being made by a touch input, using one of a user's finger, an electronic pen or an electronic tip; and wherein the interactive surface is embedded into one of a user device, a smartwatch comprising an interactive area, a smartphone comprising a touch screen or a laptop comprising a touch-pad.

17. The method according to claim 16, further comprising:

displaying, with a screen, a feedback image representing the drawing input as a drawing procedure is performed by the user; and further comprising:

applying a fadeout effect to the feedback image to show part of the feedback image drawn before a time threshold and to erase part of the feedback image drawn after the time threshold.

18. A system of identifying a user, comprising:

a processor; and a memory storing therein computer readable instructions that, when executed by the processor, cause the processor to perform the method as defined in claim 1.

19. A non-transitory computer-readable storage medium comprising computer-readable instructions, when executed by a processor, cause a computer to perform the method defined in claim 1.

* * * * *